INVENTOR.
FRANK J. SHAW

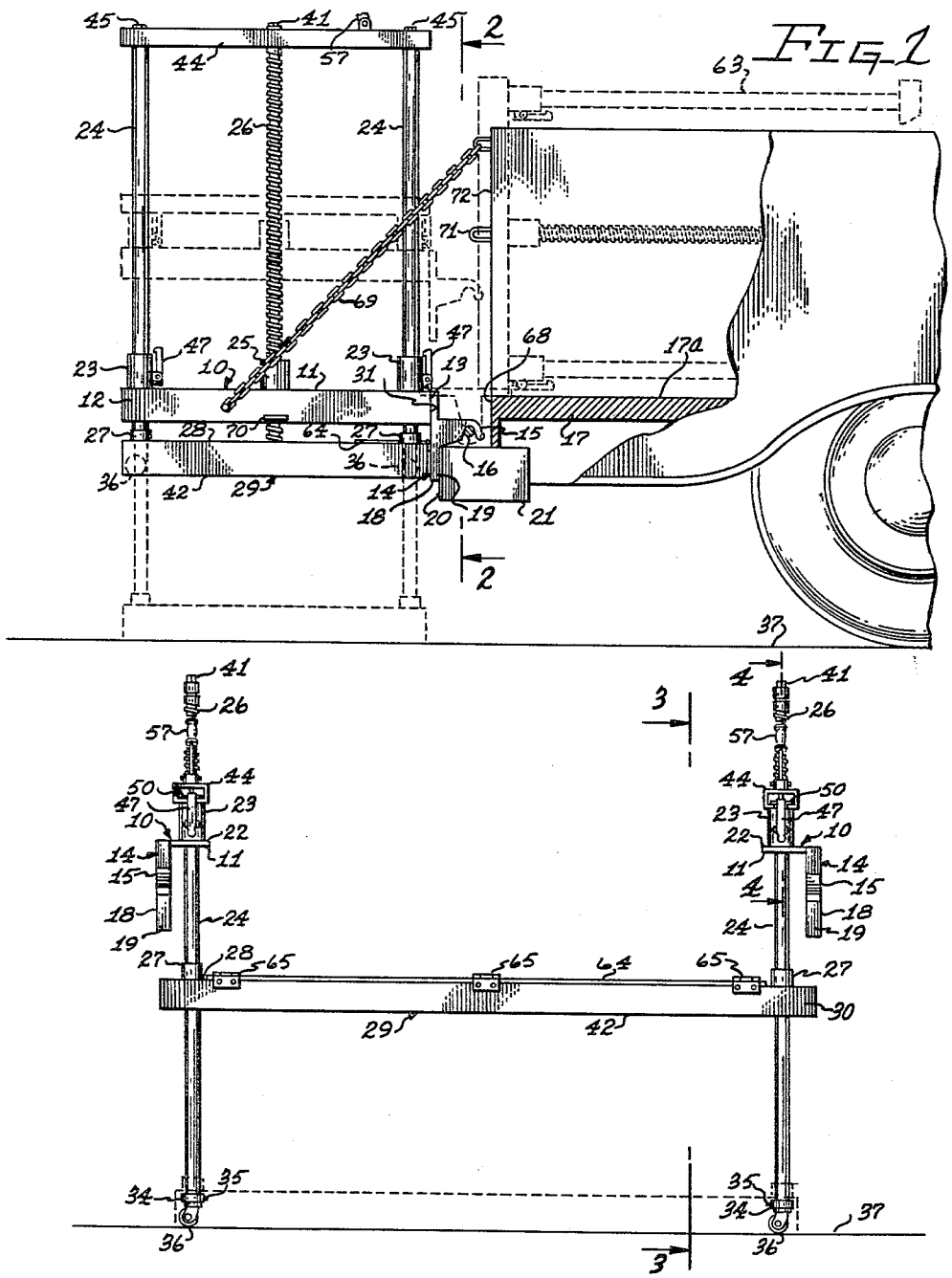

3,180,503
DETACHABLE TAIL GATE LIFT FOR A TRUCK
Frank J. Shaw, 11645 N. Cave Creek Road, Phoenix, Ariz.
Filed May 20, 1963, Ser. No. 281,707
3 Claims. (Cl. 214—75)

This invention pertains to devices for raising and lowering loads relative to a truck bed and is particularly directed to a detachable tail gate lift for a truck.

One of the objects of this invention is to provide an apparatus which may be readily used for lifting and lowering loads to be placed on or taken off of trucks.

A further object is to provide a unit as aforementioned which may be used as a separate detachable unit for lifting loads and for pushing material in a horizontal or vertical direction.

And it is also an object to provide a detachable tail gate lift apparatus having ground engaging casters or wheels which may be used for lifting loads or lowering loads and transferring them from one location to another.

Further features and advantages of this invention will appear from a detailed description of the drawings in which:

FIG. 1 is a right hand side elevation of a detachable tail gate lift for a truck incorporating the features of this invention.

FIG. 2 is a front elevation of the apparatus shown in FIG. 1, indicated by the line 2—2 in FIG. 1.

Figure 3:
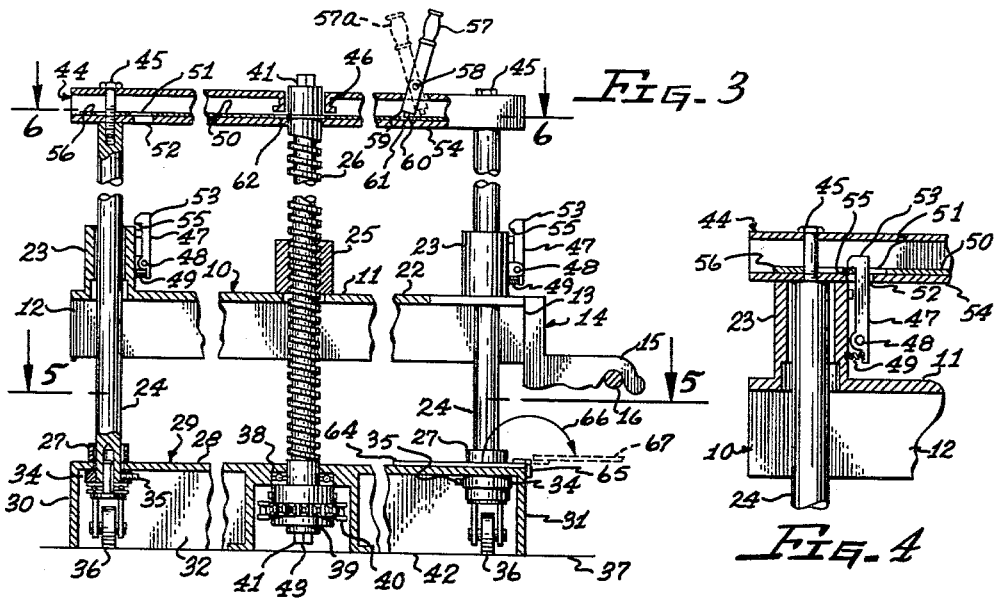
FIG. 3 is an enlarged fragmentary view of the apparatus indicated by the line 3—3 in FIG. 2.

As an example of one embodiment of this invention there is shown a detachable tail gate lift comprising a pair of laterally spaced support members 10 consisting of the horizontal top plates 11 and the integral downwardly extending sides 12. To the forward ends 13 is rigidly fixed the pivot brackets 14 having the hook portions 15 which are adapted to hook over and pivotally swing on the laterally disposed rod 16 suitably fixed to the truck bed 17. The brackets each have a depending thrust plate 18 having a forwardly facing abutment surface 19 adapted to positively limit downward swinging, counterclockwise in FIGS. 1 and 3, of the support member 10 by engaging a vertical surface 20 on the bumper 21 or other rigid surface of the truck bed or frame.

Fixed to the top surface 22 of the top plates 11 are the elongated guide sleeves 23 in which are vertically slidable guide and support tubes 24. Upstanding nuts 25 are also rigidly fixed to the top surface 22 of the support members 10 in which operate the vertically disposed elevating screws 26. The lower portions of the guide and support tubes 24 extend slidably through guide sleeves 27 fixed to the load carrying deck plate 28 of the load carrying platform 29 which includes downwardly extending integral sides 30 and 31 and ends 32 and 33 to form a rigid structure for the load carrying platform 29. Stop collars 34 are appropriately fixed by suitable set screws 35 on the lower ends of the guide and support tubes 24 to limit downward relative travel of the load carrying platform on the tubes 24. Mounted on the lower ends of the guide and support tubes are casters 36 adapted to engage and roll on the ground surface 37. The lower ends of the elevating screws are journaled against axial movement in suitable thrust bearings 38 carried in the load carrying platform 29. On the lower end of each screw 26 below the thrust bearings 38 are fixed the identical sprockets 39 over which operates the endless chain 40 so that both screws 26 rotate in synchronism when a suitable wrench, such as the usual tire tool wheel nut wrench is applied to the wrench ends 41 formed on each end of the screws 26. The lower edge 42 of the load carrying platform 29 rests on ground 37 and the lower ends 43 of the screws 26 at this time are adapted to clear the ground surface when the load carrying platform 29 is down against the ground and stop collars 34 of the casters 36.

Figure 6:
FIG. 6 is a horizontal section on the line 6—6 of FIG. 3.

The upper ends of the guide and support tubes 24 are rigidly connected to the outer ends of the laterally spaced hollow rectangular yokes 44 by suitable bolts 45. The upper ends of the elevating screws 26 are suitably journaled for both rotary and axial movement in bushings 46 carried in the yokes 44. On each of the guide sleeves 23 is an upstanding pawl 47 pivotally mounted on pins 48 so as to swing in vertical planes, counterclockwise in FIGS. 3 and 4, under the influence of compression springs 49 interacting between the guide sleeves 23 and the pawls 47. A latch plate 50 is slidably mounted longitudinally within each yoke 44 and has slots 51 aligned with larger clearance slots 52 formed in the bottom of the yokes 44 up through which may project the upper ends 53 of the pawls 47 as the yokes 44 and support members 10 move together with the upper ends 53 to engage the bottom 54 of the yokes 44. At this time the latch surface 55 of the pawls 47 engage over the top surface 56 of the latch plate 50 to secure the support members and yokes 44 together. A latch release handle 57 is pivotally mounted on a pin 58 on the yokes 44 and has a lower portion 59 with an actuating pin 60 engaging in a slot 61 formed in the latch plate, FIG. 6, whereby swinging of the handle 57 from the broken line position 57a of latching to the full line position of release, FIG. 3, releases the pawls 47 from the latch plate 50. A suitable elongated clearance slot 62 is provided in the latch plate 50 to clear the elevating screws 26.

With the unit mounted on the truck on the rod 16, it may be swung to the broken line horizontal position 63, shown in FIG. 1, whereupon the above described guide tubes, elevating screws and yokes are positioned along the sides of the truck bed 17 so as not to interfere with the load on the truck. Under these conditions the load carrying platform functions as a tail gate for the rear of the truck bed.

When the unit is swung to the full line position shown in FIG. 1 with the load carrying platform fully elevated to a level substantially even with the top 17a of the truck bed 17, the load on the truck bed surface 17a may be skidded out onto the top surface of the load carrying deck plate 28. If desired, a hinged plate 64 mounted on hinges 65 along the top edge of the front side 31 of the load carrying platform may swing in the direction of the arrow 66, FIG. 3, to the position 67 to cover the gap between the rear 68 of the truck bed and the front side 31 of the load carrying platform 29 to provide a continuous floor from the truck bed onto the platform 29.

Figure 4:
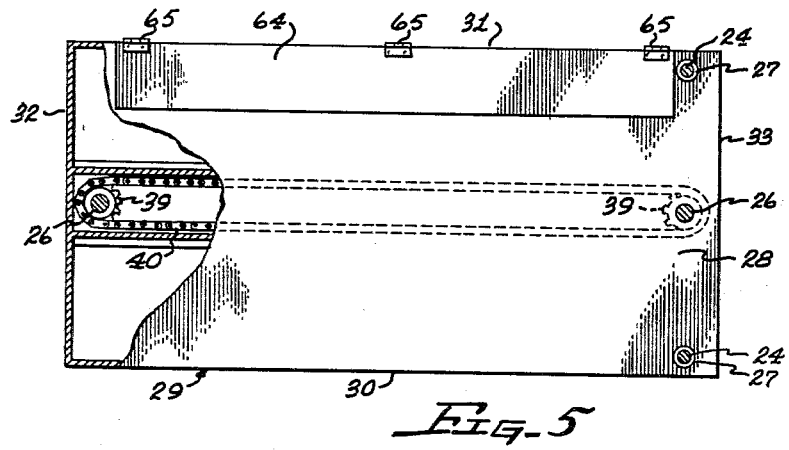
FIG. 4 is an enlarged fragmentary view on the line 4—4 of FIG. 2.
Figure 5:
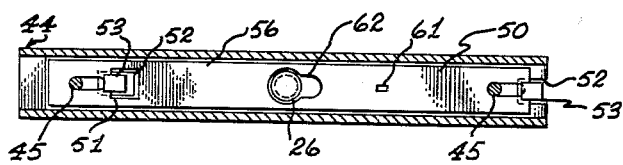
FIG. 5 is a horizontal section partly broken away on the line 5—5 of FIGS. 2 and 3.

With the load shifted from the truck bed 17 onto the load carrying platform 29, an operating wrench is suitably applied to the top of one of the wrench ends 41 of the elevating screws 26 to rotate them to lower the platform 29 and guide and support tubes to the position shown in FIG. 3. With the lower edges 42 against the floor surface 37 and the platform 29 resting on the stop collars 34, continued operation of the screws 26 in this direction thereafter causes the support member 10 to rise, lifting the pivot brackets 14 and their hook portions 15 from the rod 16 to thereby free the unit from any connection with the truck.

Continued rotation of screws 26 raises support 10 to engage pawls 47 onto latch plate 50. Then by reversing rotation of screws 26 transfers load through pawls 47 onto latch plates 50 and yokes 44 and guide and support tubes 24 causing casters 36 to extrude and contact ground 37, further rotation of screws 26 will cause load-carrying platform 29 to raise to a suitable position to clear ground for pushing the unit together with the load on the casters 36 to any desired unloading area.

In certain instances it is desirable, with the load on the unit resting on its casters 36 on the floor surface 37, to elevate the platform 29 and load to a desired height to facilitate removing the load from the unit. To do this it is merely necesary to continue to operate the screws 26 to raise platform 29, FIG. 2, to the desired height above the floor to facilitate taking the load off of the platform 29.

The reverse of the above described operations pertains when it is desired to pick up a load from an elevated position, FIG. 2, in a storage area, adjusting the load to a suitable level position with the load on latch pawls 47 and guide and support tubes 24, rolling the thus adjusted unit on the casters to the truck, then lowering the load to ground level position, FIG. 3, release latch pawls 47 by moving levers 57 to full line position, FIG. 3, reverse the rotation of screws 26 to lower the support members 10 to bring the hook portions 15 of the brackets 14 down on the rod 16 and finally elevating the platform 29 to truck bed height for skidding the load on the truck bed.

In certain situations the unit may be positively held in horizontal position, FIG. 1, by latches 70 on the support members 10 which engage suitable mating eyes 71 on the truck side 72 so that the platform 29 may be actuated horizontally of the truck bed 17 by applying an actuating wrench to the bottom ends 43 of the screws so that the tail gate backup for the load may be used to push the load forwardly of the truck bed and to provide backup for loads which might overhang the rear edge of the truck bed 17. Suitable drop chains 69 may be connected to the support members 10 and the truck side 72.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein.

Having thus fully set forth and described this invention what is claimed and desired to be obtained by United States Letters Patent is:

1. A detachable tail gate lift for a truck having a truck bed including a top and a rear end, a transverse pivot rod fixed on the truck bed, and a rear bumper fixed to the truck bed, comprising in combination:
   (a) a pair of laterally spaced support members,
   (b) pivot brackets formed on the front ends of said support members having,
   (c) hook portions adapted to engage over said transverse pivot rod,
   (d) and thrust plates adapted to engage a portion of said rear bumper to arrest downward swinging movement of said support members,
   (e) a supporting chain to assist in holding said support members against a downward swinging movement,
   (f) a load carrying platform,
   (g) guide and support means slidably interconnected with said support members and said load carrying platform,
   (h) means for transportably supporting said guide and support means on a floor surface,
   (i) elevating mechanism interconnected between said support members and said load carrying platform operable to effect relative vertical movement of said load carrying platform and said support members,
   (j) and releasable latch means between said support members and said elevating mechanism to interlock the same so that operation of said elevating mechanism causes relative vertical movement of said load carrying platform and said guide and support means when said guide and support means is supported on the floor surface.

2. A detachable tail gate lift for a truck having a truck bed including a top and a rear end, a transverse pivot rod fixed on the truck bed, and a rear bumper fixed to the truck bed, comprising in combination:
   (a) a pair of laterally spaced support members,
   (b) pivot brackets formed on the front ends of said support members having,
   (c) hook portions adapted to engage over said transverse pivot rod,
   (d) and thrust plates adapted to engage a portion of said rear bumper to arrest downward swinging movement of said support members,
   (e) a load carrying platform,
   (f) guide and support means slidably interconnected with said support members and said load carrying platform,
   (g) means for transportably supporting said guide and support means on a floor surface,
   (h) elevating mechanism interconnected between said support members and said load carrying platform operable to effect relative vertical movement of said load carrying platform and said support members,
   (i) releasable latch means between said support members and said elevating mechanism to interlock the same so that operation of said elevating mechanism causes relative vertical movement of said load carrying platform and said guide and support means when said guide and support means is supported on the floor surface,
   (j) and stop means on said guide and support means to positively limit downward relative travel of said load carrying platform and said guide and support means at the lower end thereof.

3. A detachable tail gate lift for a truck having a truck bed including a top and a rear end, a transverse pivot rod fixed on the truck bed, and a rear bumper fixed to the truck bed, comprising in combination:
   (a) a pair of laterally spaced support members,
   (b) pivot brackets formed on the front ends of said support members having,
   (c) hook portions adapted to detachably pivotally engage said transverse pivot rod to allow said support member to swing from a horizontal position behind the rear end of the truck bed to a vertical position adjacent the rear end of the truck bed,
   (d) a load carrying platform,
   (e) guide and support tubes slidably mounted in said support members and said load carrying platform,
   (f) stop means on the lower ends of said guide and support tubes to limit downward travel of said load carrying platform on said guide and support tubes,
   (g) elevating screws having their lower ends journaled against axial movement in said load carrying platform,
   (h) nuts fixed to said support members operating on said elevating screws, (i) yokes fixed to the top ends of said guide and support tubes,
(j) means on said yokes and support members for releasably latching said yokes and support members together for so actuating said elevating screws effects relative movement of said load carrying platform on said guide and support tubes,
(k) and ground surface contacting casters on the lower ends of said guide and support tubes.

References Cited by the Examiner
UNITED STATES PATENTS

| | | |
|---|---|---|
| 1,280,090 | 9/18 | Schrottky. |
| 1,927,598 | 9/33 | Schlichter _____ 254—7 |
| 2,828,030 | 3/58 | Harrington et al. _____ 214—130 |
| 2,949,197 | 8/60 | Lomen et al. |

HUGO O. SCHULZ, *Primary Examiner.*